US 9,059,941 B1

(12) United States Patent
Oweis et al.

(10) Patent No.: US 9,059,941 B1
(45) Date of Patent: Jun. 16, 2015

(54) PROVIDING ROUTER INFORMATION ACCORDING TO A PROGRAMMATIC INTERFACE

(71) Applicant: Amazon Technologies, Inc., Reno, NV (US)

(72) Inventors: Marwan Salah El-Din Oweis, Olney, MD (US); Patrick Brigham Cullen, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/290,680

(22) Filed: May 29, 2014

(51) Int. Cl.
*H04L 12/24* (2006.01)
*H04L 12/28* (2006.01)
(Continued)

(52) U.S. Cl.
CPC .......... *H04L 45/586* (2013.01); *H04L 47/2466* (2013.01)

(58) Field of Classification Search
CPC ................ H04L 12/28; H04L 12/4641; H04L 29/08972; H04L 41/082; H04L 41/0803; H04L 41/0853; H04L 41/0886; H04L 41/0893; H04L 41/12; H04L 41/50; H04L 41/5096; H04L 43/0817; H04L 43/0876; H04L 43/18; H04L 69/24; H04L 45/50; H04L 45/52; H04L 45/56; H04L 45/60; H04L 45/306; H04L 45/566; H04L 45/586; H04L 47/20; H04L 47/24; H04L 47/622; H04L 47/627; H04L 47/2425; H04L 47/2466; H04L 47/6275; H04L 61/2015; H04L 63/10; H04L 63/101; H04L 63/102; H04L 67/00; H04L 67/02; H04L 67/025; H04L 67/14; H04L 67/16; H04L 67/32; H04L 67/34; H04L 67/1002; H04L 67/101; H04L 67/104; H04L 67/2852; H04L 67/2866; G06F 8/71; G06F 9/00; G06F 9/455; G06F 9/541; G06F 11/3048; G06F 17/30194; G06F 17/3023; G06F 17/30321; H04N 5/23206; H04N 21/252; H04N 21/437; H04N 21/472; H04N 21/482; H04N 21/44222; H04N 21/4431; H04N 21/64723; H04N 21/64738; H04N 21/8173; H04W 84/12; H04W 4/001; H04W 8/14; H04W 76/02; H04W 92/18
USPC ......... 370/230–241, 252, 254–258, 396–411, 370/901–914; 709/220–244, 249–253
See application file for complete search history.

(56) References Cited

U.S. PATENT DOCUMENTS 6,810,427 B1  10/2004  Cain et al.
7,072,946 B2   7/2006  Shafer
(Continued)

*Primary Examiner* — Tri H Phan
(74) *Attorney, Agent, or Firm* — Robert C. Kowert; Meyertons, Hood, Kivlin, Kowert & Goetzel, P.C.

(57) ABSTRACT

A provider network may implement providing router information according to a programmatic interface. A plurality of routers may be implemented as part of provider network. Clients that utilize these routers may wish to obtain information specific to one or more routers in order to configure communications utilizing the particular router. A request may be received for the information from the client that is formatted according to the programmatic interface that is platform-independent. The requests may be maintained along with other received requests until selected for servicing according to a priority scheme. The request may be translated into one or more versions of the request that are formatted according to a interfaces specific to the one or more routers. The translated one or more versions of the request may be sent to the one or more routers to obtain the information from the one or more routers. The information may then be provided to the client.

22 Claims, 10 Drawing Sheets

(51) Int. Cl.
   *G06F 15/16* (2006.01)
   *H04L 12/713* (2013.01)
   *H04L 12/855* (2013.01)

(56) References Cited

U.S. PATENT DOCUMENTS

| | | |
|---|---|---|
| 7,499,459 B1 | 3/2009 | Scudder et al. |
| 7,886,075 B2 | 2/2011 | Molteni et al. |
| 8,036,139 B2 * | 10/2011 | Kouvelas ................. 370/254 |
| 8,126,722 B2 * | 2/2012 | Robb et al. ................ 705/1.1 |
| 8,266,269 B2 * | 9/2012 | Short et al. ............... 709/223 |
| 8,478,849 B2 * | 7/2013 | Marl et al. ................ 709/223 |
| 2002/0191619 A1 * | 12/2002 | Shafer ...................... 370/401 |
| 2005/0182675 A1 * | 8/2005 | Huettner ..................... 705/14 |
| 2008/0049779 A1 * | 2/2008 | Hopmann et al. ........ 370/431 |
| 2013/0219082 A1 | 8/2013 | Mitomi et al. |
| 2014/0006481 A1 * | 1/2014 | Frey et al. ................. 709/203 |

* cited by examiner

PROVIDING ROUTER INFORMATION ACCORDING TO A PROGRAMMATIC INTERFACE

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers, may wish to take advantage of private or direct connections to provider networks, rather than utilizing publicly available connections (e.g., via the Internet). In this way, the connections between these customers and provider networks can be optimized for performance and increased utilization of provider network resources. However, as provider networks adapt networking infrastructure, customers may have to modify or change their private connections. As part of keeping current with provider networks, customers may need to obtain information about the underlying provider network infrastructure in order to continue to take advantage of their private connections.

Figure 1:
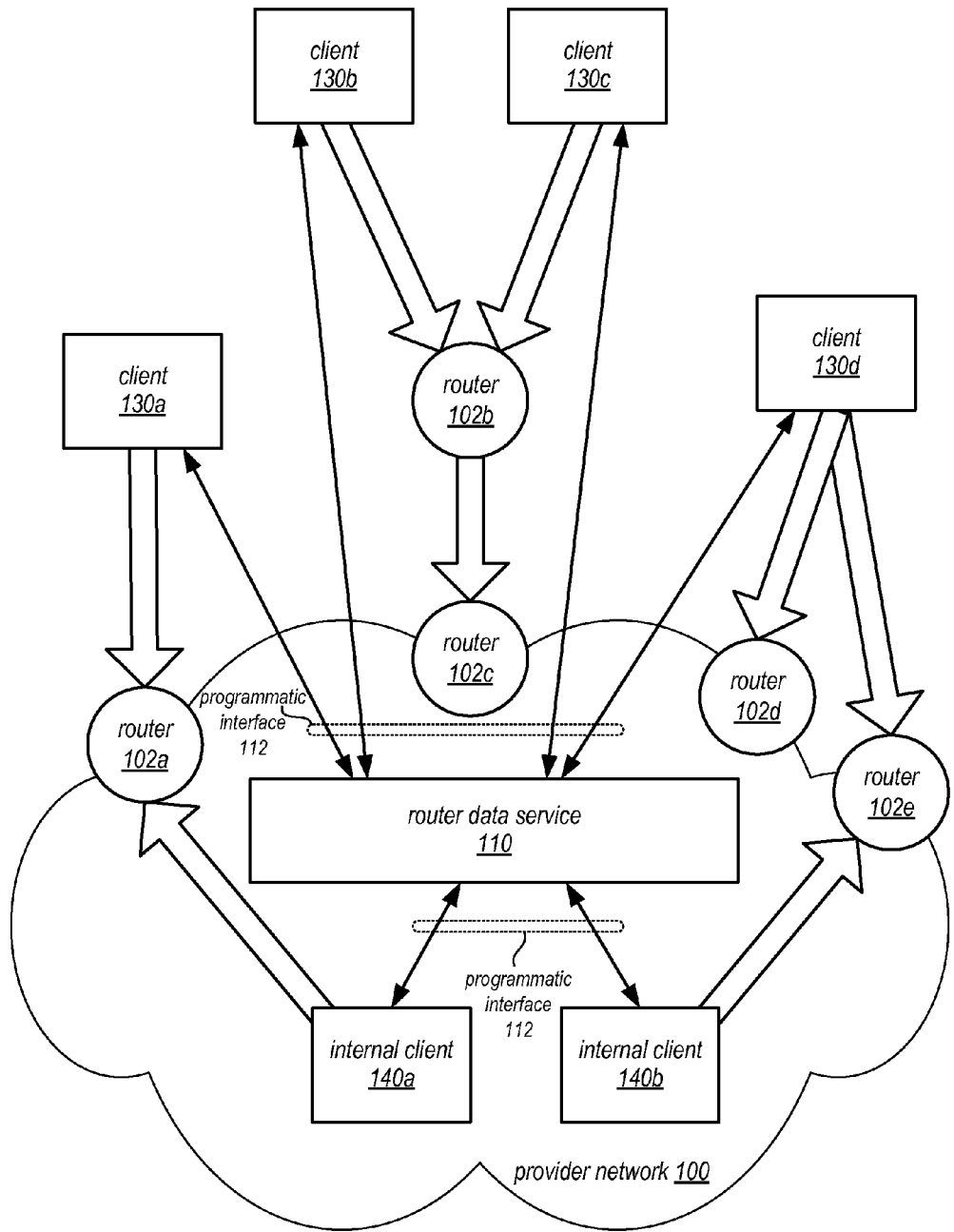
FIG. 1 is a diagram of a provider network implementing a number of routers to provide connections to the provider network as well as a programmatic interface that is platform-independent for obtaining router information about specific routers, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement providing router information according to a programmatic interface, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Clients of the provider network may reserve (i.e., purchase or buy) one or more compute resources (such as compute instances) or utilize other resources to perform various functions, services, techniques, and/or applications.

Provider networks, however, may implement many different components, systems, or devices to provide access to the various services offered by the provider network. In various embodiments, large numbers of heterogeneous routers may be implemented in order to provide access to a provider network. As part of providing access however, some clients may have to configure connections to the provider information based on a particular router. Information about the particular router may thus be useful and/or necessary to properly or efficiently manage or operate a connection to a provider network. For example, if a connection is experiencing connection problems, certain router information about the specific router that the connection is established with may be useful to troubleshoot and identify a corrective action. However, as different routers implement different types of interfaces for obtaining router information, it may be difficult for clients of a provider network to obtain the information needed to configure, manage, or operate the connection as needed. A programmatic interface may allow clients to obtain router information from a router data service without having to understand how the interfaces of specific routers in the provider network are implemented.

FIG. 1 is a diagram of a provider network implementing a number of routers to provide connections to the provider network as well as a programmatic interface that is platform-independent for obtaining router information about specific routers, according to some embodiments. Provider network 100 may be may be set up by an entity such as a company or a public sector organization to provide one or more network-based services (such as various types of cloud-based computing or storage) accessible via the Internet and/or other networks to clients 130. Provider network 100 may include numerous data centers hosting various resource pools, such as collections of physical and/or virtualized computer servers, storage devices, networking equipment and the like, needed to implement and distribute the infrastructure and services offered by the provider network 100. Clients 130 may be configured to access provider network via respective routers 102. In some embodiments, routers 102 may be edge routers for provider network 100.

Provider network 100 may include the hardware (e.g., modems, routers, switches, load balancers, proxy servers, etc.) and software (e.g., protocol stacks, accounting software, firewall/security software, etc.) necessary to establish a networking links between different components of provider network 100 as well as external networks (e.g., the Internet). In some embodiments, provider network 100 may employ an Internet Protocol (IP) tunneling technology to provide an overlay network via which encapsulated packets may be passed through the provider network 100 using tunnels. However, in some embodiments, clients 130 may access the underlying network via private or physical connections. In FIG. 1, clients 130a, 130b, 130c, and 130d may access provider network via established private connections (illustrated by the broad arrows). Routers 102 may facilitate these private or physical connections. For example, client 130a connects via router 102a. Clients 130b and 130c connect through router 102b, which is connected to provider network 100 via router 102c. Client 130d may connect via two different routers 102d and 102e respectively. Please note that the previous discussion is not intended to be limiting as to the varying combinations of connections that may be made between clients and routers.

Clients 130 may encompass any type of client configurable to manage, operate or configure connections to provider network 100. For example, a given client may implement various tools, scripts, or other modules that may be able to configure a respective connection, test the connection, and start or terminate the connection. As part of managing the connections clients 130 may also obtain router information about specific routers. Thus, client 130b may obtain information about router 102c by sending requests for router information to router data service 110 which may be formatted according to programmatic interface 112 which is platform independent. Router data service 110 may query the router 102c according to the specific interface for the router and provide the requested information back to client 130b.

In order submit requests to router data service, a given client 130 may include a suitable version of a web browser, or may include a plug-in module or other type of code module configured to execute as an extension to or within an execution environment provided by a web browser. Alternatively, a client 130 may encompass an application such as a router management or information client (or user interface thereof) that may make use of router data service 110 to obtain various router information about a specific router. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 130 may be configured to generate network-based services requests according to a Representational State Transfer (REST)-style network-based services architecture, a document- or message-based network-based services architecture, or another suitable network-based services architecture.

Although not illustrated, in some embodiments clients 130 may convey network-based services requests to router data service 110 via an external network, which may be a public connection to provider network. In various embodiments, the external network may encompass any suitable combination of networking hardware and protocols necessary to establish network-based communications between clients 130 and router data service 110. For example, a network may generally encompass the various telecommunications networks and service providers that collectively implement the Internet. A network may also include private networks such as local area networks (LANs) or wide area networks (WANs) as well as public or private wireless networks. It is noted that in some embodiments, clients 130 may communicate with router data service 110 using a private network rather than the public Internet.

Some clients of provider network may be internal clients 140. Internal clients 140 may operate similar to external clients 130, except that they may be provisioned within provider network 100 and may implement one or more of the services or resources provided by provider network 100. For example, internal client 140a may be implemented as part of an internal network configuration or mapping service, and thus may need to obtain information for router 102 which may implement part of the connections that the mapping service manages. Thus, internal clients may too communicate with router data service 110 to obtain router information via programmatic interface 112.

Please note that previous descriptions are not intended to be limiting, but are merely provided as an example of provider networks, clients, and routers. The number or arrangement of components, such as the number or arrangement of clients or routers may be implemented in many different ways. Various other components may interact with or providing router information according to a platform independent router programmatic interface.

This specification next includes a general description of a router data service, which may implement a programmatic interface for providing router information for routers implemented as part of a provider network. Then various examples of a router data service are discussed, including different components/modules, or arrangements of components/module that may be employed as part of implementing a router data service. A number of different methods and techniques to implement providing router information according to a platform independent programmatic interface are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
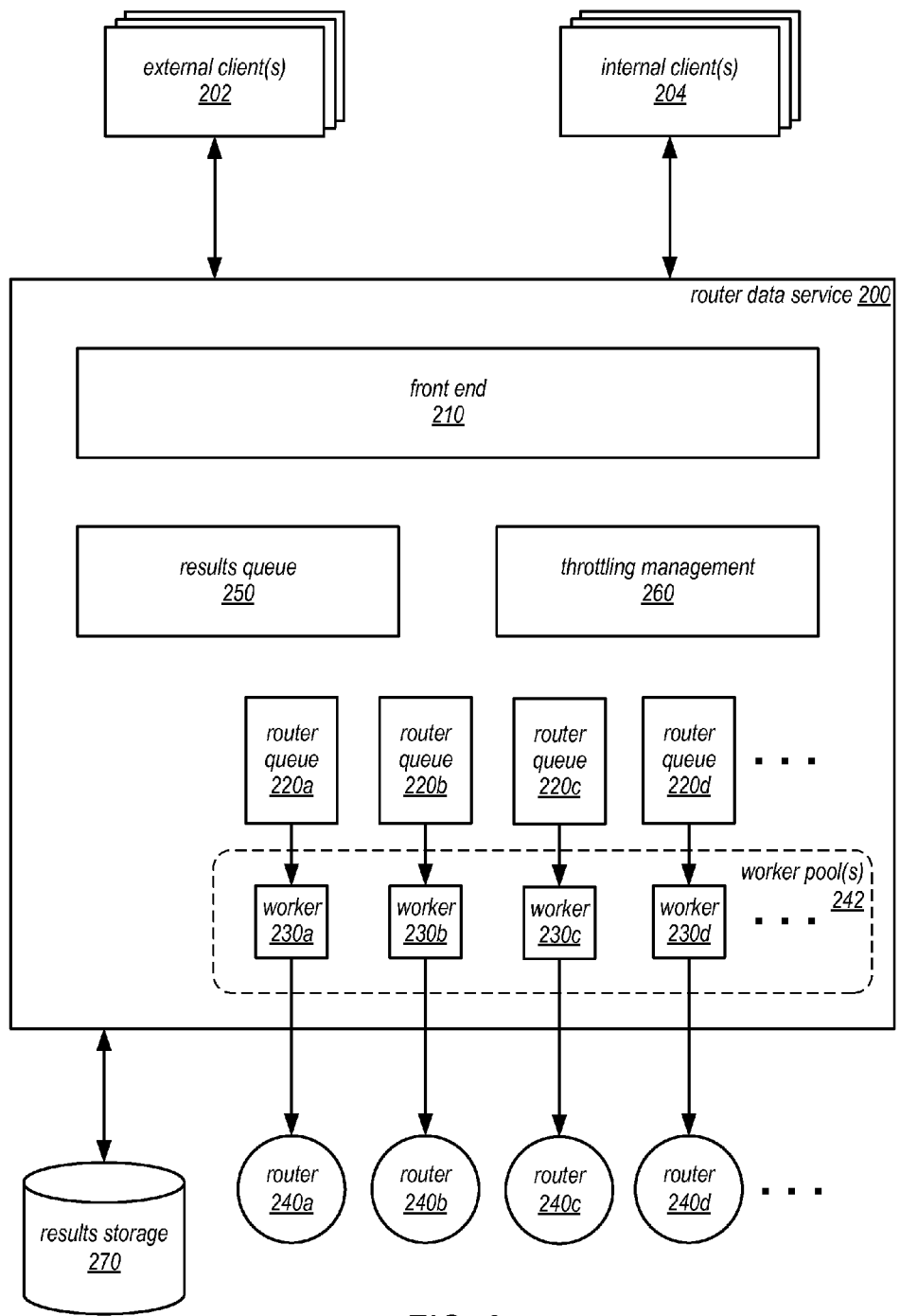
FIG. 2 is a block diagram of a router data service implementing a router programmatic interface, according to some embodiments.

FIG. 2 is a block diagram of a router data service implementing a programmatic interface, according to some embodiments. Router data service 200 may be implemented across a variety of servers, nodes, or other computing systems or devices (such as computing system 1000 described below with regard to FIG. 10). It is noted that where one or more instances of a given component may exist, reference to that component herein may be made in either the singular or the plural. However, usage of either form is not intended to preclude the other.

As described above with regard to FIG. 1, clients external 202 and internal 204 to a provider network may make use of routers 240 to communicate with and operate in a provider network. Routers 240 settings and other information may impact or be configurable by clients, thus external client(s) 202 and internal client(s) 204 may communicate with router data service 200 to obtain particular router information for specific routers. In various embodiments, router data service may implement front end 210. Front end 210 may be configured to receive, parse, handle, direct or otherwise process requests sent to router data service 200. Front end 210 may, in some embodiments, be configured to parse or understand requests formatted according to the platform-independent programmatic interface and direct these requests to the appropriate components of router data service 200 to handle the request. For example, front end 210 may receive a request for router 240b. Front end 210 may be configured to send the request to router queue 220b which maintains requests for router 240b, in some embodiments. In some embodiments, a single request may be for aggregate information from multiple routers, such as routers 240a, 240b, and 240c. Front end 210 may also implement various other service functionalities, such as handling identification or authorization of clients to perform particular requests (e.g., based on access credentials or access lists). In some embodiments, front end 210 may collect various usage or other performance metrics of router data service 210 and provide them to storage or to another system component or device for analysis.

In various embodiments, router data service 200 may implement router specific cues, such as router queues 220a, 220b, 220c and 220d, which correspond to routers 240a, 240b, 240c and 204d respectively. Router queues 220 may be implemented on or more computing nodes, systems or devices to maintain pending requests for router data. In at least some embodiments, router queues 220 may be priority queues, such as priority queue 310 discussed below with regard to FIG. 3. In at least some embodiments, respective workers 230 may handle pulling requests from router queue 220 to be translated and sent to a router 240. In some embodiments, as described in FIG. 3 below, workers 230 may be configured to select which requests to pull, throttle incoming requests, translate the requests into new versions of requests for the router information, and send the requests to routers 240. However, in some embodiments, workers 230 may perform only some of these functions, such as selecting requests and/or throttling requests, while other components may translate and send the requests. Workers 230 may be provisioned for performing work for a particular router 240 from worker pool(s) 242. Worker pool(s) 242 may be a single pool of workers configured to service requests for any of routers 240, or may be different respective pools of workers for each of the routers. If a worker 230 fails, or otherwise becomes unavailable, workers in the worker pool(s) 242 may be configured to elect a new worker to take the place of the failed worker 240. As illustrated in FIG. 2, workers may be at least configured to service a particular router, thus worker 230a services router 240a, worker 230b services router 240b, worker 230c services router 240c, and worker 230d services router 240d.

Figure 8:
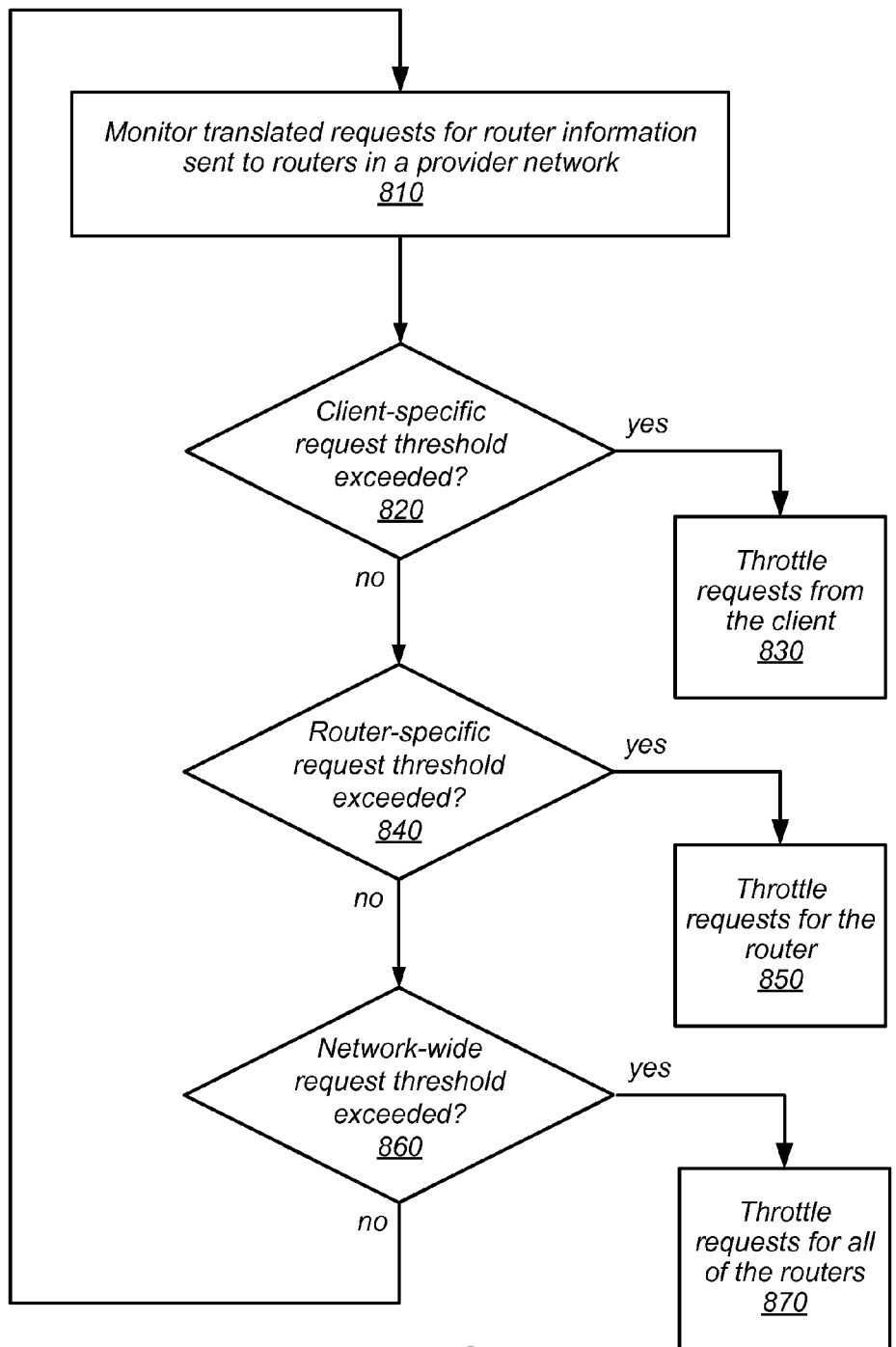
FIG. 8 is a high-level flow chart that illustrates various methods and techniques for throttling requests for router information to routers in a provider network, according to some embodiments.

In at least some embodiments, router data service 200 may implement throttling management module 260 to analyze, determine, coordinate, and/or enforce throttling for the entire provider network routers. For instance, throttling management module 260 may be configured to track the number of translated requests sent to routers 240, and determine an overall rate of incoming requests. Based, on the determined rate and other information about the status of the provider network (e.g., historical information about provider network traffic levels), throttling management module 260 may, in some embodiments, determine particular throttling thresholds to enforce at workers 230, and may send the throttling thresholds to the workers to enforce. FIG. 8, discussed below provides many different techniques for determining and enforcing throttling which throttling management module 260 may implement, in some embodiments.

Figure 9:
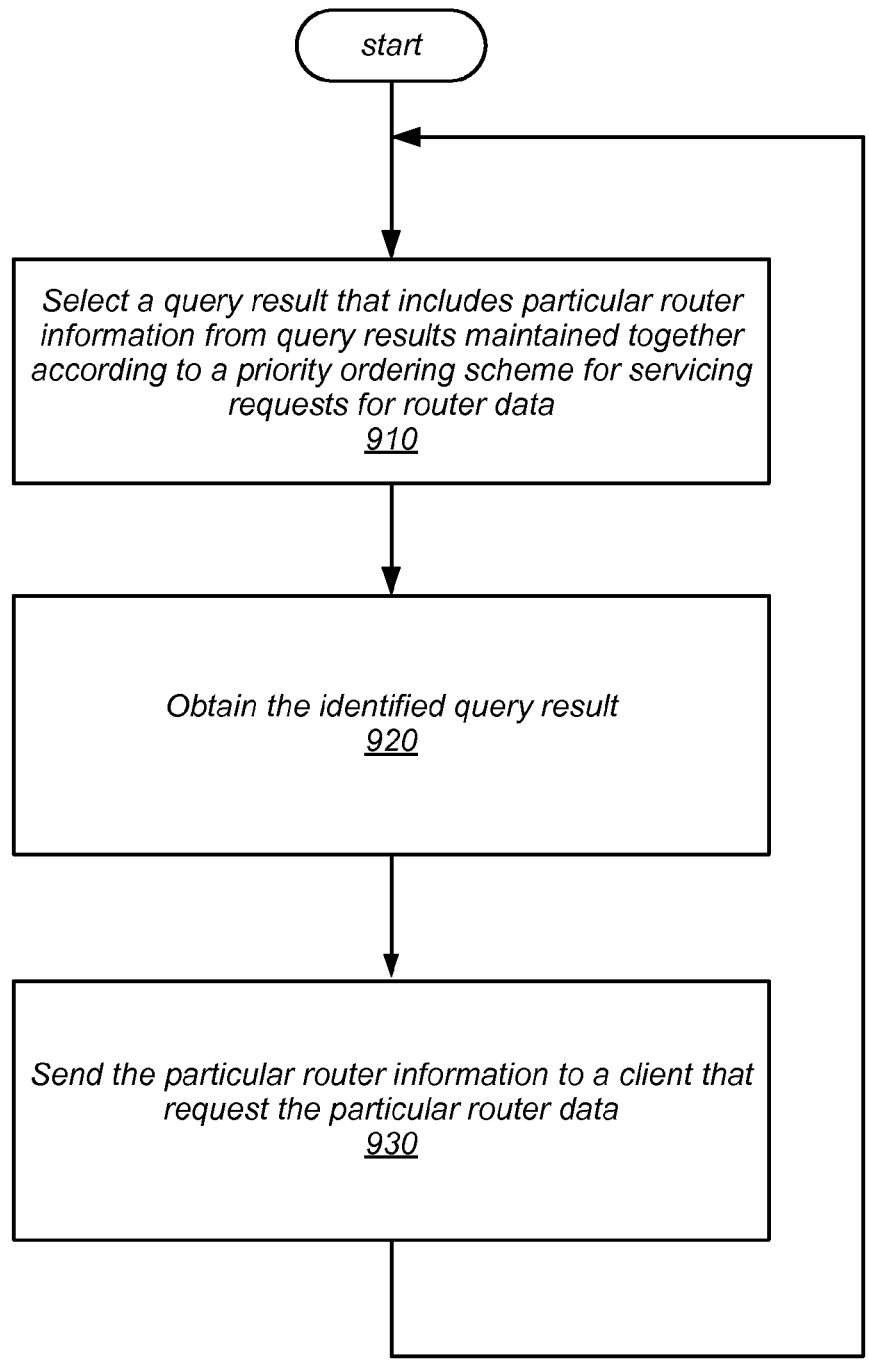
FIG. 9 is a high-level flow chart that illustrates various methods and techniques for selecting retrieved router information to provide to clients, according to some embodiments.

Results from requests to routers 240 may be stored in results queue 250, in some embodiments. Router data service 200 may implement results queue 250 in order to maintain query results that include requested router information. Front end 210 or another component may selectively obtain those query results in order to provide the results to clients 202 and 204. FIG. 9, discussed below, provides various examples of techniques that may be implemented to select results from results queue 250. In some embodiments, router data service 200 may also be configured to store some results in a persistent data store, results storage 270. Results storage 270 may maintain health or other information that is periodically or frequently obtained. In some embodiments, some requests for router information may be service by accessing results storage 270 and obtaining some the data store there.

Figure 3:
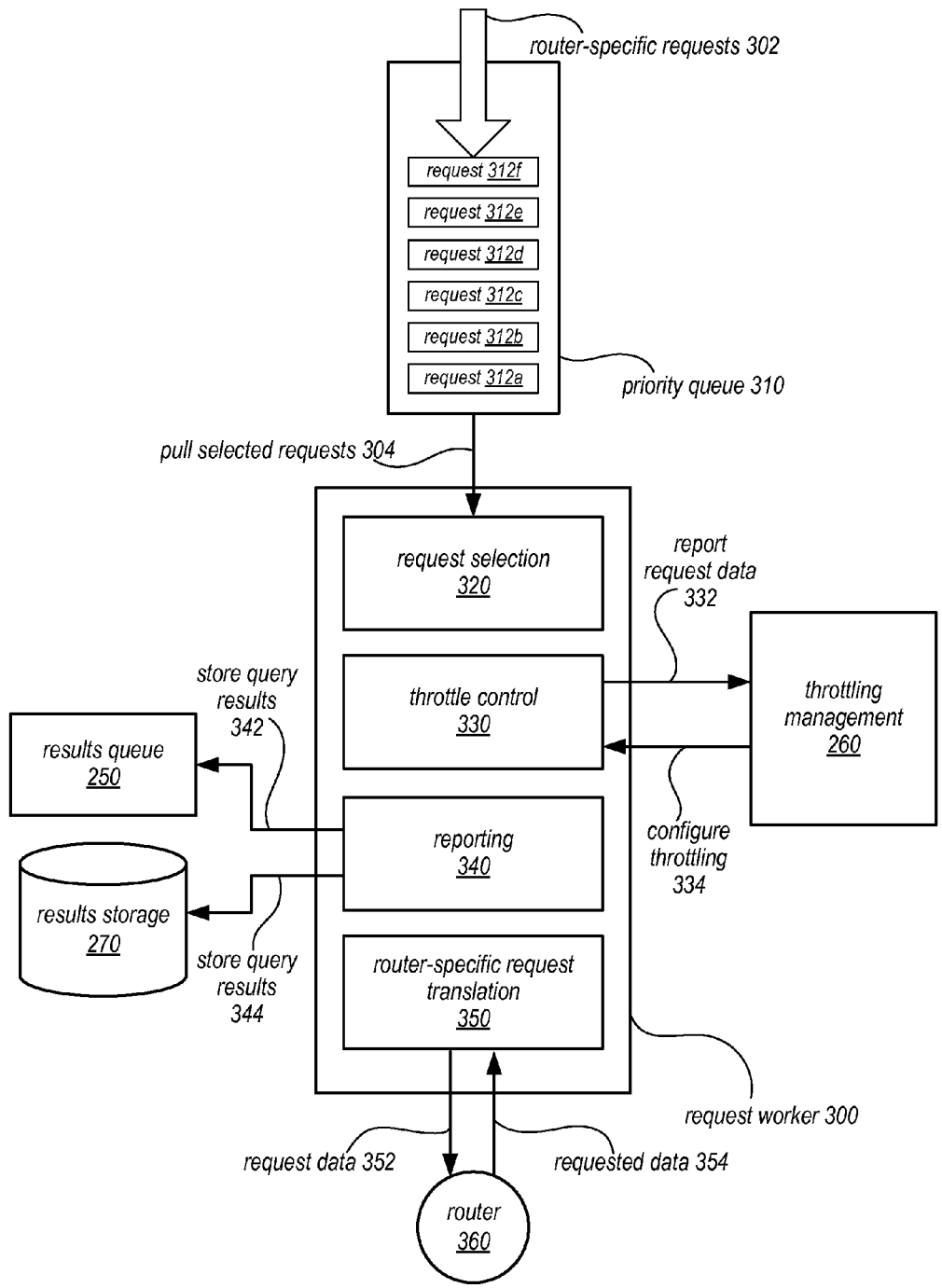
FIG. 3 is a block diagram of a request worker that services requests for a particular router, according to some embodiments.

FIG. 3 is a block diagram of a request worker that services requests for a particular router, according to some embodiments. Request worker 300 selects requests maintained in priority queue 310 to be translated for servicing. The translated version of the request may be sent to router 360. Results may then be provided to results queue 250 and/or results storage 270. Request worker 300 may be implemented on one or more computing nodes, systems, or devices (e.g., computing system 1000 described below with regard to FIG. 10). The various components illustrated may be configured in hardware and/or software components.

Priority queue 310 maintains various router specific requests that are directed to priority queue 310 by front end 210 (described in FIG. 2 above) or another component or device. Requests 312a, 312b, 312c, 312d, 312e and 312f, may be maintained in priority queue 310 until selected for servicing. Request worker 300 may, in various embodiments, implement request selection module 320. Request selection module 320 may evaluate the requests in priority queue 310 and pull selected requests 304 for servicing. For example, in some embodiments, the request selection module 320 may determine or receive indications of priority scores for requests 312. Based, at least in part, on these priority scores, request selection module 320 may select those requests 312 with the highest or near highest priority scores to service. Request selection module 320 may implement the various techniques for request selection described below with regard to FIGS. 6 and 7, including optimizing or combining multiple requests 312 into a single or reduced number of translated versions of requests.

In various embodiments, request worker 300 may implement throttle control 330. Throttle control 330 may enforce various throttling thresholds or techniques against requests that may be sent to router 360. In some embodiments, throttle control 330 may report requests for tracking to throttling management 260, as well as receive throttling thresholds and other information or instructions to configure throttling 334 from throttling management component. Throttle control 330 may, for example, monitor the rate of requests for router 360 and throttle all requests to router 360, specific types of requests, such as low priority requests, or requests from a specific client. Throttle control 330 may implement the various throttling techniques discussed below with regard to FIG. 8, in some embodiments.

In various embodiments, request worker 300 may implement reporting module 340. Reporting module 340 may be configured to handle received query results, and store the obtained router information at one or more locations. For example, reporting module 340 may determine that obtained router data may be health or status information that is stored 344 in results storage 270. While for other received query results, reporting module 340 may be configured to determine that the obtained router information is for servicing a particular request, and store 342 the request router information in results queue 250. In some embodiments, reporting module 340 may be configured to determine that data for a newly received request is stored in results queue 250.

In various embodiments, request worker 354 may implement router-specific request translation module 350. Router-specific request translation module 350 may be configured to translate requests 312 formatted according to the programmatic interface into a programmatic interface specific to router 360. Router-specific request translation module 350 may access one or more libraries or knowledge bases accessible to request worker 300 in order to perform the translation. Router-specific request translation module 350 may then send the translated request 352 for data, and receive back the requested data 354. In some embodiments, router-specific request translation module 350 may be configured to translate the requested data 354 back into a format compatible with the programmatic interface.

Figure 4:
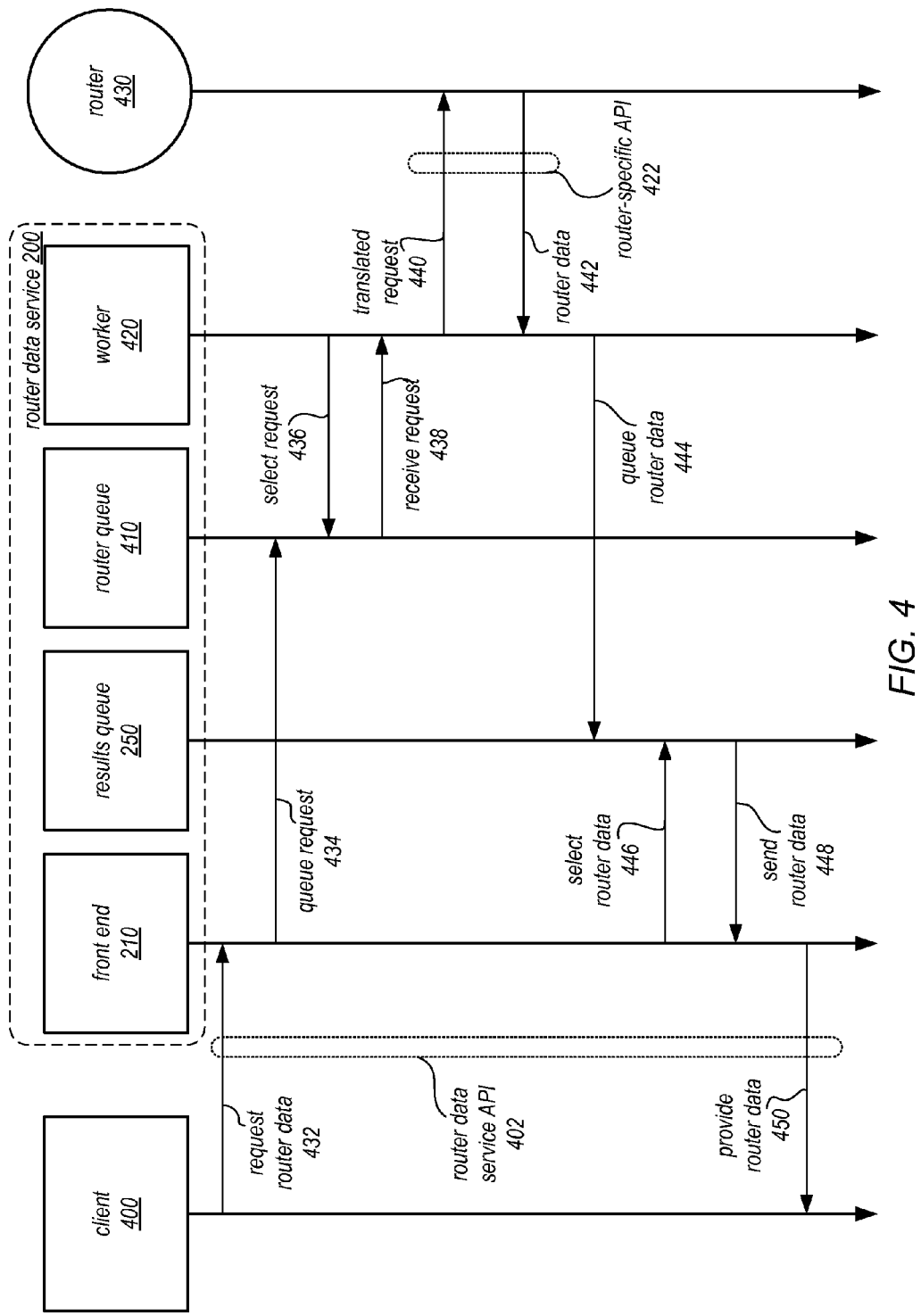
FIG. 4 is a diagram illustrating interactions between a client device and a router data service, according to various embodiments.

FIG. 4 is a diagram illustrating interactions between a client device and a router data service, according to various embodiments. Client 400 may be any kind of client of provider network that utilizes router 430. In various embodiments client 400 may be an internal client, such as internal clients 204, or an external client, such as external clients 202. Client 400 may interact with router data service 200 via router data service API, which may be a platform-independent in various embodiments. For example, client 400 may send a request for router data or information 432 from router 430 formatted according to router data service API 402, which is received at front end 210. Front end 210 may evaluate the request and queue the request 434 in the appropriate router queue 410 for router 430. Worker 420 may pole router queue 410 to evaluate the pending requests for router 430. Worker 420 may select the request 436 according to a priority scheme for pending requests and receive or pull the request 438 from router queue 410.

Worker 410 may translate the request into a version of a request that is formatted according to a router specific API 422 for router 430. Please note that although one request is illustrated the request may be for multiple requests, and thus multiple versions of the request may be generated and sent according to specific routers APIs 422. In some embodiments, the requests may be translated into any version of an interface (which need not be an API). Once translated, the new version of the request may be sent 440 to router 430 in order to obtain the requested data. Router 430 may service the request 440 and send back router data 422, which may also be formatted according to router-specific API 422. Worker 420 may then queue the retrieved router data 444 into results queue 250. In some embodiments, the results from multiple routers may be aggregated and sent as a response to a single request for information from multiple routers. Front end 210 may then select the retrieved router data 446 from results queue 250 and receive the router data 448. Front end 210 may then provide the requested router data 450 to client 400.

Figure 5:
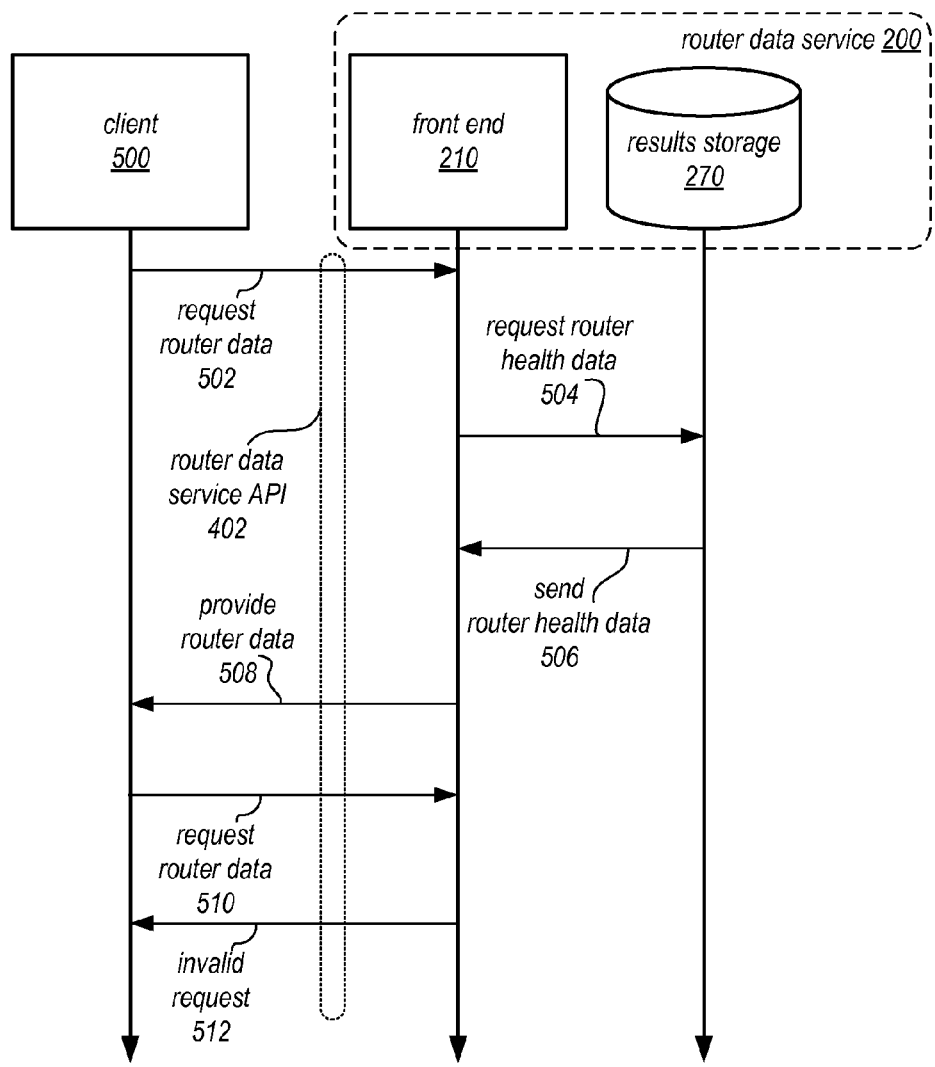
FIG. 5 is a diagram illustrating interactions between a client device and a router data service, according to various embodiments.

FIG. 5 is a diagram illustrating interactions between a client device and a router data service, according to various embodiments. As with FIG. 4, discussed above, router data service 200 may implement front end 210 to handle client requests. For example, client request 502 for router data may be formatted via router data service API 402, and received at front-end 210. As discussed above, some router data or information may be maintained in a persistent data store, as results storage 270 (or results queue 250). In this example, the requested router data 502 is maintained in results storage 270. A request for the data may be sent 504 to retrieve the data from results storage 270, which may send back the requested data 506. Front end 210 may determine whether the data from results storage 270 is still valid, in some embodiments. If the data is still valid, then front end 210 may provide the router data 508 to client 500. If not valid, then front end 210 may perform the various request handling messages and techniques illustrated in FIG. 4 above.

In another example illustrated in FIG. 5, client 500 sends a request 510 for router data to front end 210. This request, however, may be improperly formatted or invalid (e.g., with respect to the router data service API 402). As a result, an invalid request message 412 may be sent back to client 500, which may indicate the reason for the invalidity (e.g., the response may include an error code).

Figure 6:
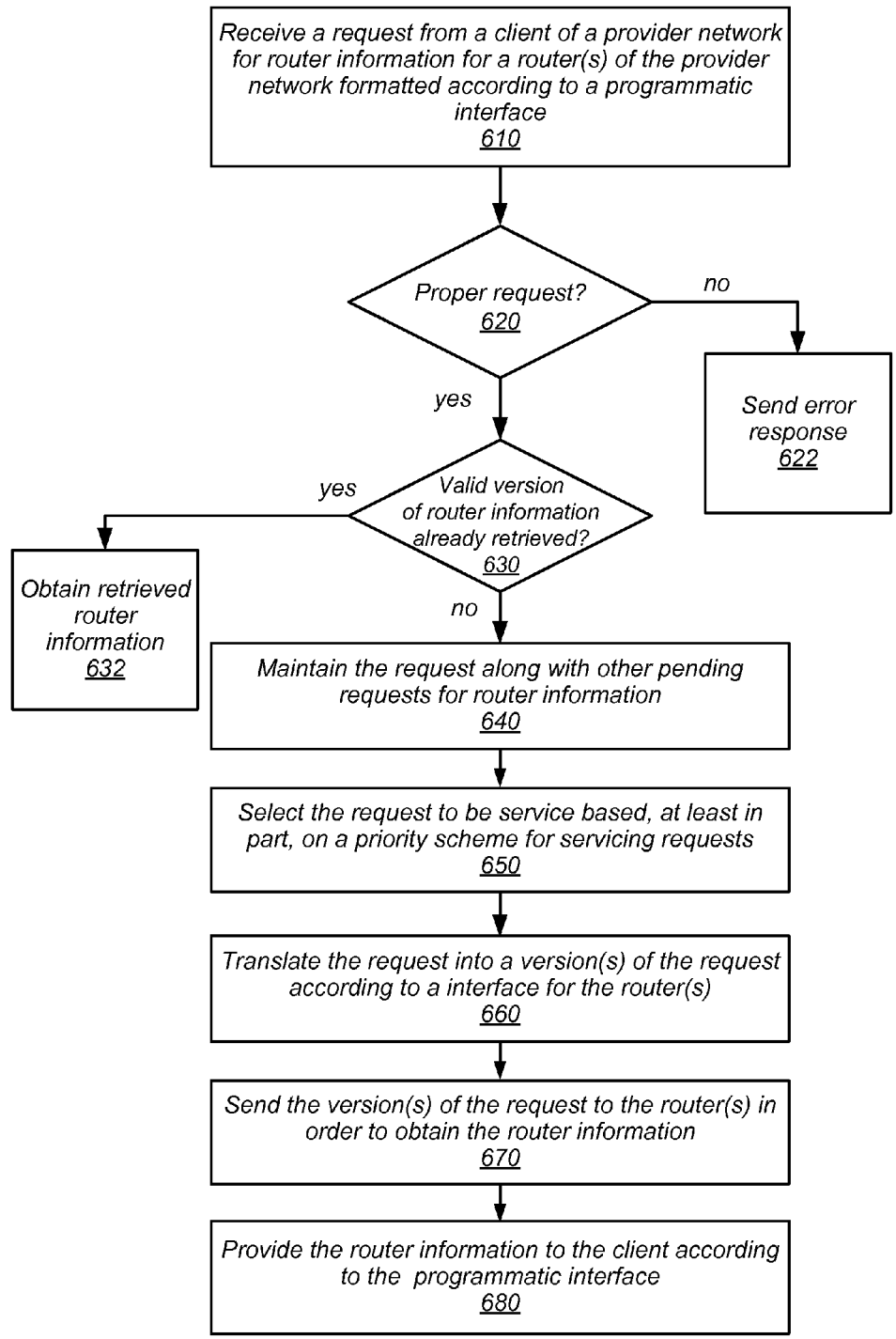
FIG. 6 is high-level flowchart illustrating various methods and techniques for implementing a programmatic router interface, according to some embodiments.

The examples of implementing providing router information according to a programmatic interface discussed above with regard to FIGS. 1-5 have been given in regard to a particular provider network. Various other types or configurations of a provider network may implement these techniques. Other architectures or configurations of router data services, for example, for which a programmatic interface are implemented, for instance, may implement a network entity registry. For example, a single group or queue of requests for all routers may be maintained and requests may be pulled from the single group for translation, sending, and other processing. FIG. 6 is high-level flowchart illustrating various methods and techniques for providing router information according to a programmatic interface, according to some embodiments. These techniques may be implemented using various components of a provider network as described above with regard to FIGS. 1-5 or other provider network components.

As indicated at 610, a request may be received from a client of a provider network for particular router information for a specific one or more routers of the provider network, in various embodiments. The request may be formatted according to a programmatic interface (API), in at least some embodiments. The programmatic interface may support requests or queries for router information from multiple different types of routers. Each of these different types of routers may be configured to be accessed differently, such as according to different programmatic interfaces that are specific to a particular router type. For example, different specific interfaces (e.g., APIs) for router types may require or use different keywords to obtain the same information (e.g., link status for a particular link on the router). Whereas programmatic interface for router information that is platform independent may allow the same format for a request (e.g., the same key word to check link status), whether directed to one router type or another.

Various different types of router information may be requested, in some embodiments. For example, link status, Border Gateway Protocol (BGP) status, Address Resolution Protocol (ARP) status, Virtual Local Area Network (VLAN) tagging, errors, received routes, advertised routes, or any other router information for which a client may take action to affect. In at least some embodiments, clients may have a private connection to the provider network. Thus, requests for router information may include any information useful for configuring and/or operating the private connection. Note, that clients may also be internal to the provider network.

Once received, a request may be evaluated to determine whether the request is proper, as indicated at 620. Proper requests may conform to various formatting, keywords, data fields, or other programmatic interface specified requirements. In at least some embodiments, proper requests may also be evaluated as to whether the client has authority or access rights to make the particular request. Internal clients, for example, may have greater access rights and may thus utilize a wider range of requests of the programmatic interface than external clients. As indicated by the negative exit from 620, an error response 622 may be sent to a client that sent an improper request. The error response may indicate the particular problem with request (e.g., too many flags set or unauthorized access), or the error response may simply deny the request. The error response itself may be formatted according to the programmatic interface, in various embodiments.

As indicated at 630, it may also be determined whether the particular router information has already been requested. For example, some router information may be periodically, or frequently, gathered from the routers in the provider network. This router information may be centrally stored or located so that different provider network services or components may be able to access the data without requesting the data from the routers. The data may be stored and may indicate an expiration point, after which the data may no longer be valid. For instance, in some embodiments, router health information obtained from the routers may be stored in persistent storage for subsequent access. If the particular router information is already or previously retrieved, then as indicated by the positive exit from 630, the particular router information may be obtained (e.g., from the persistent data store maintaining the previously retrieved router information).

If the particular information has not been previously retrieved (or was previously retrieved but is no longer valid), then the request may be maintained along with other pending requests for router information for the specific router, as indicated at 640. For instance, in some embodiments, requests for a specific router may be maintained or inserted into a queue (e.g., a priority queue), or other data structure for the router from which the pending requests may be later selected for service. However, in other embodiments the request may be also maintained with requests for other routers, thus the previous example is not intended to be limiting.

Figure 7:
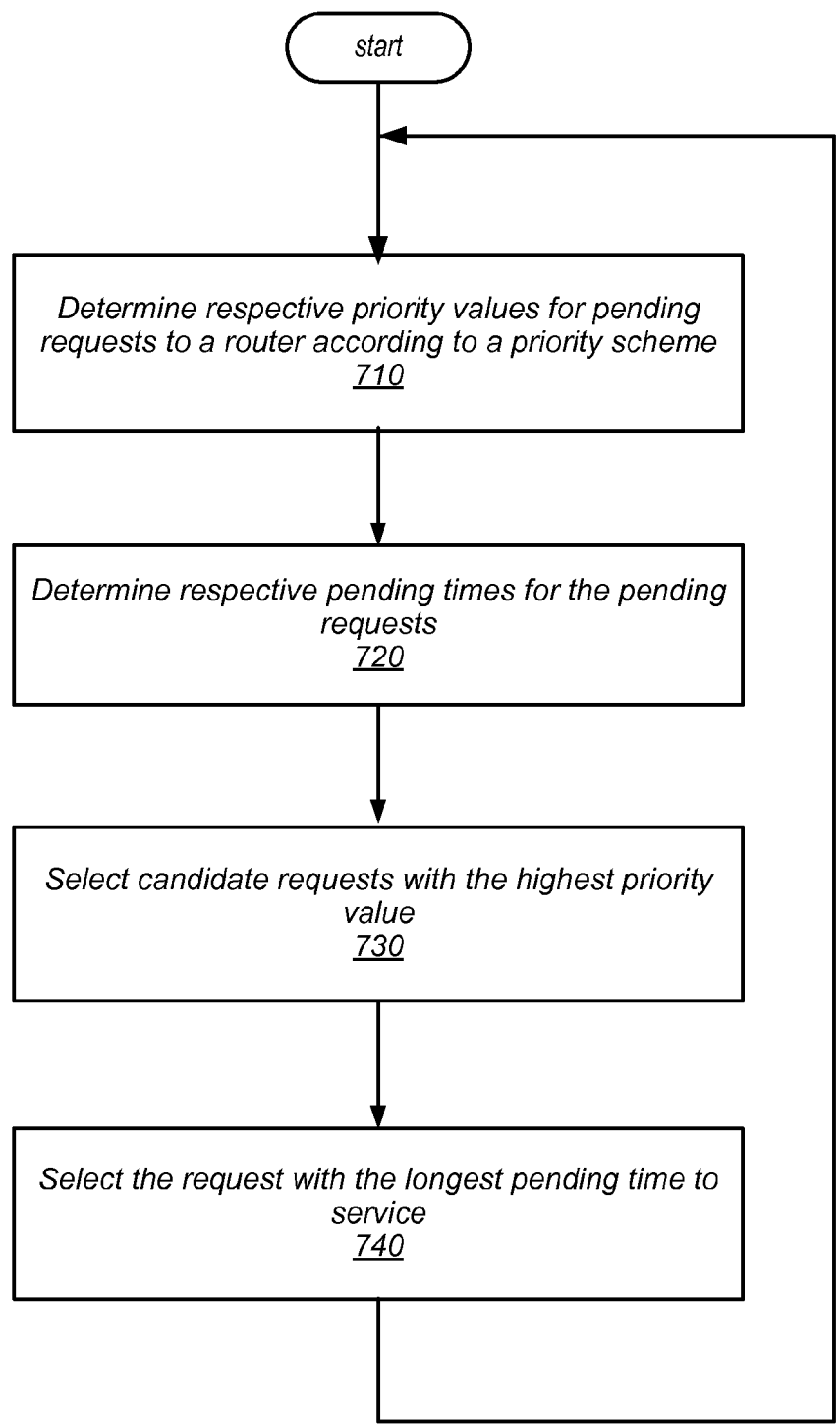
FIG. 7 is a high-level flow chart that illustrates various methods and techniques for selecting requests for router information to be serviced according to a priority scheme, according to various embodiments.

Requests may then be selected to be serviced, in various embodiments, based, at least in part, on a priority scheme for servicing requests, as indicated at 650. A priority scheme may be simply defined, providing coarse grained prioritization. For example, request from internal clients may be considered high-priority and may be selected for processing before requests from external clients (even if the requests from the external clients were received prior to the internal client requests), in some embodiments. Conversely, requests from external clients may be completed after requests from internal clients, in some embodiments. Fine grained priority schemes may allow for varying priority scores or values to be determined for request which may range widely and cause, for example, a request from an external client to be selected prior to a request from an internal client dependent on the particular type of request from each client. FIG. 7, discussed below, provides further examples of selecting requests according to a priority scheme. In at least some embodiments, multiple requests may be selected and combined into a single translated version of a request. For example, the multiple requests may each request the same router information, or the respective router information for the requests may be obtained by sending a single translated request to the specific router. In some embodiments, these optimizations may be specific to the specific router, as the programmatic interfaces for routers may vary from one type or router to another.

Once selected, the request may be translated into a version of the request for the particular information according to a programmatic interface for the specific router, in various embodiments, as indicated at 660. For instance a "GET BGP STATUS" platform-independent request may be translated into a "ACCESS BGP-STATUS" router specific request for the specific router. Translating the requests may include populating the various fields of the translated version with converted keywords, some of which may or may not be the same, as well as other data, symbols, or structure sufficient to satisfy the specific programmatic interface for the router.

As indicated at 670, once translated the version of the request may be sent to the specific router in order to obtain the particular information. For instance, each router may maintain a specific interface allocated only for API requests. Thus, the request may be sent to the specific interface in order to be processed as an API request at the specific router.

As indicated at 680, the particular router information may then be provided to the client, in various embodiments, according to the programmatic interface. Router information and/or other query results received from a specific router may be handled in various ways. In some embodiments, the obtained router information may be sent to the client as it is obtained. In some embodiments, the particular information may be stored in a data structure, such as queue, and selectively or intelligently sent to the requesting client, as described below with regard to FIG. 9.

FIG. 7 is a high-level flow chart that illustrates various methods and techniques for selecting requests for router information to be serviced according to a priority scheme, according to various embodiments. In order to ensure that certain requests providing information for important functions, clients (e.g., internal clients/services of the provider network), or events are detected and fast-tracked (or not kept waiting on much larger numbers of less important requests to be serviced), various priority schemes may be implemented, as noted above. As indicated at 710, respective priority values may be determined for pending requests to a router according to a priority scheme, in various embodiments. For example, a front end component (e.g., front end 210 described above with regard to FIG. 2) or other interface that handles requests may mark, grade, score, or otherwise indicate the priority of particular request based, for example, on the source (external or internal client), type of requests (emergency requests or periodic health checks), particular router information requested, amount of information requested, or any other information describing the request or client submitting the request. Similarly, the requests may be scored when being evaluated for selection (e.g., by a worker 230 in FIG. 2).

In addition to determining priority values, in some embodiments, respective pending times may be determined, as indicated at 720. Timestamps, or other indicators, may be included with requests to provide a reference point as to when a request was received, allowing a pending time to be calculated. In some embodiments, pending times may be implicit or inherently described relative other requests. For example, in some embodiments, requests may be maintained in a priority queue. The queue may itself indicate when particular requests are received by the ordering in which the requests are maintained, for instance.

Candidate requests may be selected with the highest determined priority value, in various embodiments, as indicated at 730. For instance, if 3 requests have the same priority score 8, which may be the highest priority score among the pending requests, then the 3 requests may be identified as candidate requests. If, however, there is a single request with the highest score, than that single request may be selected for service (without performing any comparison of pending times, as indicated at 740). For multiple requests for which there is a tie or similar priority value (and are thus selected as candidate requests), the request with the longest pending time may be selected as request to service, as indicated at 740. For example, the candidate request closest to the front of the priority queue, may be selected ahead of other candidate requests with the same or similar priority values.

FIG. 8 is a high-level flow chart that illustrates various methods and techniques for throttling requests for router information to routers in a provider network, according to some embodiments. Throttling requests to routers in a provider network may be implemented with respect to various views of incoming router requests. Router-specific views, client-specific views, or even network-wide views may be utilized to implement both coarse-grained and fine-grained control of the rate at which router requests are serviced at the routers. In this way, routers may be able to perform routing functions at an efficient or optimal capacity.

As indicated at 810, translated requests for router information that are sent to routers in a provider network may be monitored, in various embodiments. For example, various rates or aggregate numbers of requests may be collected, calculated, or otherwise determined. In some embodiments, a centralized component may track the number of incoming requests for all of the routers in a provider network (e.g., throttling management module 260 in FIG. 2). Thus, a network-wide view of requests for routers may be evaluated. However, in some embodiments, individual components (e.g., workers 230) may monitor or track requests sent to a particular router as well.

In some embodiments, it may be determined whether requests exceed a client-specific threshold, as indicated at 820. For example, a client-specific threshold may be set to limit or prevent abusive behavior or requests by a particular client. Thus, requests for the client at either a specific router or some/all of the routers in a provider network may be tracked and evaluated. A particular rate of requests (e.g., within a specific time period) or aggregate number of requests may be determined. If the rate or aggregate number of requests from the client exceeds the client-specific threshold, then, as indicated by the positive exit from 820, requests from the client may be throttled, as indicated at 830. For instance, subsequently received requests may be lowered in priority value, or suspended for consideration for a particular period of time. In some embodiments, throttling the requests may include bouncing or dropping certain requests from a router queue or other structure maintaining requests.

In some embodiments, it may be determined whether requests exceed a router-specific threshold, as indicated at 840. For example, a router-specific threshold may be set to limit or prevent a particular router from being overwhelmed, impeding performance of the particular routers other functions (e.g., routing). Thus, requests received at the specific router in a provider network may be tracked and evaluated. A particular rate of requests (e.g., within a specific time period) or aggregate number of requests may be determined. If the rate or aggregate number of requests for the specific router exceeds the router-specific threshold, then, as indicated by the positive exit from 840, requests for the specific router may be throttled, as indicated at 850. For instance, subsequently received requests may be lowered in priority value, or suspended for consideration for a particular period of time. In some embodiments, low priority requests may be delayed from consideration, while higher priority requests may experience little throttling delay. Throttling the requests may include bouncing or dropping certain requests from a router queue or other structure maintaining requests.

In some embodiments, it may be determined whether requests exceed a network-wide threshold, as indicated at 860. For example, a network-wide threshold may be set to limit or prevent the routers of the provider network from being overwhelmed as a whole, impeding performance of the provider network caused by traffic congestion at the routers. Thus, requests received at the specific router in a provider network may be tracked and evaluated. A particular rate of requests (e.g., within a specific time period) or aggregate number of requests may be determined for the requests sent/processed at the routers. If the rate or aggregate number of requests for the provider network exceeds the network-wide threshold, then, as indicated by the positive exit from 860, requests for all of the routers in the provider network may be throttled, as indicated at 870. For instance, subsequently received requests may be lowered in priority value, or suspended for consideration for a particular period of time. In some embodiments, low priority requests may be delayed from consideration, while higher priority requests may experience little throttling delay. Throttling the requests may include bouncing or dropping certain requests from a router queue or other structure maintaining requests. In some embodiments, different individual thresholds for specific routers may be determined and enforced. For example, some routers may experience higher request loads for router information. These routers may be provided with or have throttling thresholds enforced that are lower (and therefore more strict) than other routers. In this way, problematic or key routers for the provider network may be targeted in order to protect certain network trafficking resources, or prevent the spread or impact of overwhelmed routers that are impacting the performance of the routers of the network as a whole.

FIG. 9 is a high-level flow chart that illustrates methods and techniques for selecting retrieved router information to provide to clients, according to some embodiments. As noted above, requests for router information may be service according using various priority schemes and throttling techniques so as not to overwhelm routers of the provider network, inhibiting performance of their respective routing functions, as well as servicing high-priority requests for information. Similarly, providing the results of requests to clients may be accomplished so that those requests that are of higher priority or need for the requested information receive results sooner. Achieving this flexibility may be accomplished in variety of ways. For example, separate queues for different priorities of requests may be maintained for the results of queries, so that requested information in the higher priority queues may be quickly processed and sent to requesting clients.

In another example, results for requests may be stored or maintained together, but still may be selectively provided to clients. These results may, as discussed above with maintaining received requests, be maintained in a priority queue or other data structure that provides a respective position in an ordering for results as well as a priority for results. In some embodiments, as indicated at 910, a query result may be selected that includes particular router information from a group of query results maintained together according to a priority scheme for servicing requests for router data. In at least some embodiments, the priority scheme may be the same as used to select requests for processing. For instance, a high priority request that is quickly selected for servicing may also be quickly selected to be provided to the requesting client. Pending times may also be used, as discussed above with regard to FIG. 7. For example, 2 query results may have the same priority value, so time pending may be used to send the router information in the query result that has "waited" longest. In some embodiments, various mechanism may be implemented to ensure that some query results are not perpetually delayed in place of higher priority requests. For example a particular mechanism may increment the priority values of query results with time pending over a certain threshold of time. The queue of results may also be used, in some embodiments, to store information from individual routers and aggregate the information together before sending a single response to a client.

As indicated at 920, once selected, the identified query result may be obtained. For example, a request to the storage device or other component storing or hosting the query result may be sent in order to retrieve the query result. Once received the router information included the query result that was request may be formatted and sent according to the programmatic interface that sent the request, as indicated at 930.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 10:
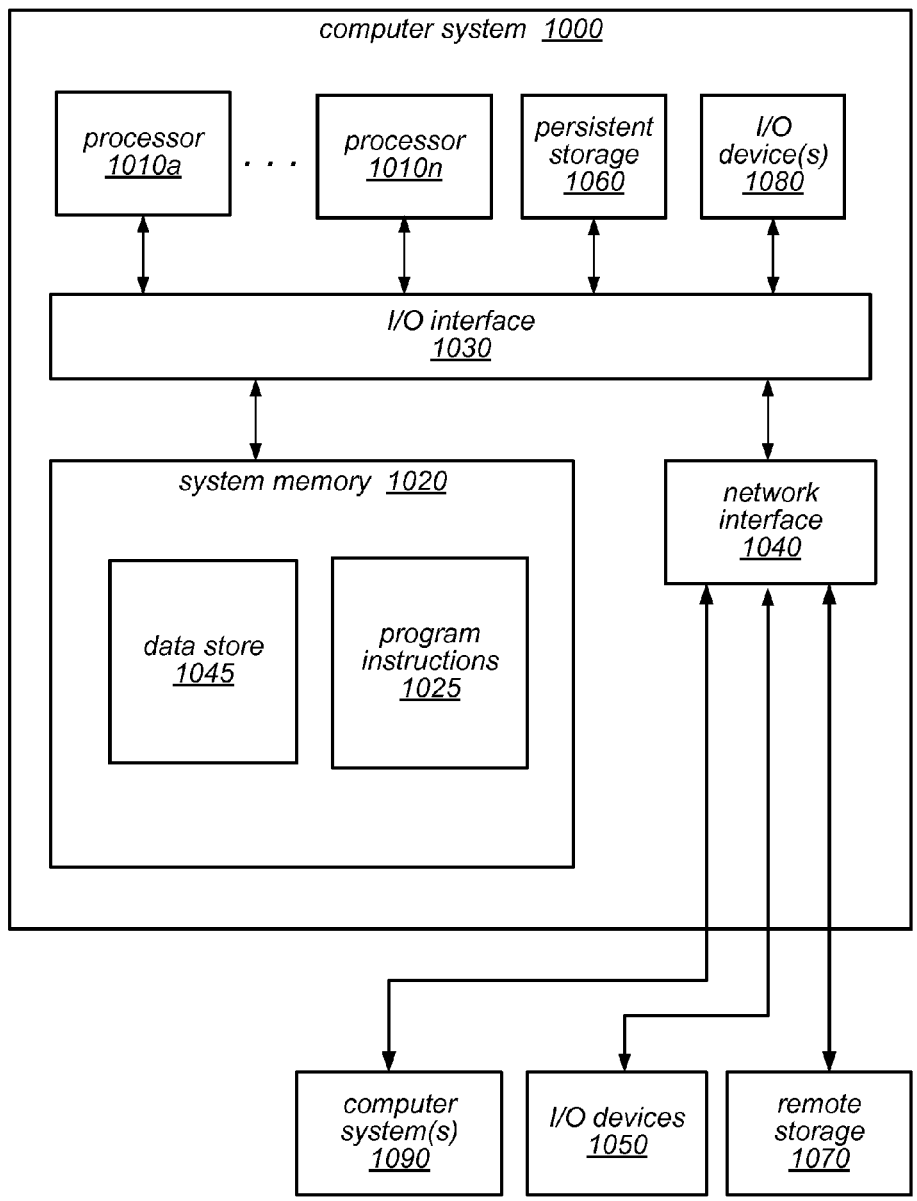
FIG. 10 is a block diagram illustrating an example computing system, according to some embodiments.

Embodiments of providing router information according to a programmatic interface as described herein may be executed on one or more computer systems, which may interact with various other devices. FIG. 10 is a block diagram illustrating an example computer system, according to various embodiments. For example, computer system 1000 may be configured to implement nodes of a router data service, a persistent data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
a plurality of routers that are each configured to provide a respective one or more private connections to the provider network, wherein at least some of the plurality of routers are different than at least some other ones of the plurality of routers;
a plurality of compute nodes that together implement a router data service for the provider network;
the router data service, configured to:
receive a request from a client of the provider network for router information for specified one or more routers of the plurality of routers, wherein the request is formatted according to a programmatic interface;
maintain the request along with a plurality of other pending requests for router information for the specified one or more routers;
select the request to be serviced based, at least in part, on a priority scheme for servicing requests for the plurality of routers;
in response to the selection of the request to be serviced:
translate the request for the router information into one or more versions of the request, the one or more versions of the request formatted according to a respective one or more interfaces for the specified one or more routers;
send the one or more versions of the request to the specified one or more routers in order to obtain the router information; and
provide the router information to the client according to the programmatic interface.

2. The provider network of claim 1,
wherein a plurality of different clients send a plurality of requests for router information from different ones of the plurality of routers, wherein the router data service is further configured to perform said receiving, said maintaining, said selecting and said sending for each of the plurality of requests such that a plurality of translated versions of the plurality of requests are sent to the different ones of the plurality of routers;
wherein the plurality of compute nodes implement a service throttling manager and a plurality of workers for servicing requests to the plurality of routers;
the service throttling manager configured to:
monitor the plurality of translated versions of the plurality of requests sent to the different ones of the plurality of routers;
based, at least in part, on said monitoring, determine a throttling request threshold;
send the throttling request threshold to the plurality of workers;
the plurality of workers, configured to:
throttle sending of translated versions of subsequently received requests to the plurality of routers such that the throttling request threshold is not exceeded.

3. The provider network of claim 1, further comprising:
a persistent data store, configured to maintain previously retrieved router information for the plurality of routers;
wherein the router data service is further configured to:
receive another request from the client for other router information for the specified one or more routers, wherein the other request is formatted according to the programmatic interface;
determine that the other router information is maintained in the previously retrieved router information at the persistent data store; and
in response to determining that the other router information maintained in the persistent data store is valid, send the other router information maintained in the previously retrieved router information at the persistent data store to the client.

4. The provider network of claim 1, wherein the request along with a plurality of other pending requests for router information for the specified one or more routers are maintained in a priority queue.

5. A method, comprising:
performing, by one or more computing devices:
receiving a request from a client of a provider network for router information from specified one or more routers of the provider network, wherein the request is formatted according to a programmatic interface, wherein the specified one or more routers are one or more of a plurality of routers implemented as part of the provider network, wherein at least some of the plurality of routers are different than at least some other ones of the plurality of routers;
sending one or more versions of the request for the router information to the specified one or more routers in order to obtain the router information, wherein the one or more versions of the request are formatted according to a respective one or more interfaces for the specified one or more routers; and
providing the router information to the client according to the programmatic interface.

6. The method of claim 5, further comprising:
maintaining the request along with a plurality of other pending requests for router information for the specified one or more routers;
selecting the request to be serviced based, at least in part, on a priority scheme for servicing requests for the plurality of routers; and
wherein the sending of the one or more versions of the request is performed in response to selecting the request.

7. The method of claim 6, wherein a plurality of different clients send a plurality of requests for router data from different ones of the plurality of routers, wherein said receiving, said maintaining, said selecting and said sending are performed with respect to each of the plurality of requests such that a plurality of translated versions of the plurality of requests are sent to the different ones of the plurality of routers, and wherein the method further comprises:
monitoring the plurality of translated versions of the plurality of requests sent to the different ones of the plurality of routers;
based, at least in part, on said monitoring, determining that a throttling request threshold is exceeded;
in response to determining that the throttling request threshold is exceeded, throttling translated versions of subsequently received requests sent to at least one of the plurality of routers.

8. The method of claim 7, wherein the throttling request threshold is a threshold specific to a particular client of the plurality of clients, and wherein said throttling translated versions of the subsequently received requests comprises throttling requests received from the particular client such that the threshold specific to the particular client is not exceeded.

9. The method of claim 7, wherein the throttling request threshold is a threshold specific to the provider network, and wherein said throttling translated versions of the subsequently received requests comprises throttling requests at each of the plurality routers such that the threshold specific to the provider network is not exceeded.

10. The method of claim 6, wherein said selecting the request to be serviced comprises:
   determining respective priority values for the request and each of the plurality of other pending requests for router information for the specified one or more routers according to the priority scheme;
   determining respective pending times for the request and each of the plurality of other pending requests for router information for the specified one or more routers;
   identifying one or more pending requests from among the request and each of the plurality of other pending requests with the highest respective priority value as candidate requests; and
   selecting from among the one or more candidate requests a candidate request with a longest respective pending time, wherein the selected candidate request is the request.

11. The method of claim 5, wherein the client is a client external to the provider network, wherein the request is selected after one or more of the other pending requests are selected, wherein the one or more other pending requests are received from clients internal to the provider network.

12. The method of claim 5, wherein the client is a client internal to the provider network, wherein the request is selected before one or more of the other pending requests are selected, wherein the one or more other pending requests are received from clients external to the provider network.

13. The method of claim 5, wherein another request from the client for other router information from the specified one or more routers is received that is formatted according to the programmatic interface, and wherein the method further comprises:
   determining that the other router information is previously retrieved and is valid; and
   in response to said determining, providing the other router information to the client.

14. The method of claim 5, wherein said providing the router information to the client comprises:
   selecting a query result that includes the router information according to the priority scheme for servicing requests for the plurality of routers, wherein the query result is maintained along with a plurality of other query results including respective router information;
   obtaining the selected query result; and
   sending the router information to the client.

15. A non-transitory, computer-readable storage medium, storing program instructions that when executed by a plurality of computing devices cause the plurality computing devices to implement:
   receiving a request from a client of a provider network for router information from specified one or more routers of the provider network, wherein the request is formatted according to a programmatic interface, wherein the specified one or more routers are one or more of a plurality of routers implemented as part of the provider network, wherein at least some of the plurality of routers are different than at least some other ones of the plurality of routers;
   translating the request for the router information into one or more versions of the request for the router information formatted according to a respective one or more interfaces for the specified one or more routers;
   sending the one or more versions of the request to the specified one or more routers in order to obtain the router information; and
   providing the router information to the client according to the programmatic interface.

16. The non-transitory, computer-readable storage medium of claim 15, wherein the program instructions further cause the one or more computing devices to further implement:
   maintaining the request along with a plurality of other pending requests for router information for the specified one or more routers;
   selecting the request to be serviced based, at least in part, on a priority scheme for servicing requests for the plurality of routers; and
   wherein the translating the request and the sending of the one or more versions of the request are performed in response to selecting the request to be serviced.

17. The non-transitory, computer-readable storage medium of claim 16, wherein a plurality of different clients send a plurality of requests for router data from different ones of the plurality of routers, wherein said receiving, said maintaining, said selecting, said translating, and said sending are performed with respect to each of the plurality of requests such that a plurality of translated versions of the plurality of requests are sent to the different ones of the plurality of routers, and wherein the program instructions cause the one or more computing devices to implement:
   monitoring the plurality of translated versions of the plurality of requests sent to the different ones of the plurality of routers;
   based, at least in part, on said monitoring, determining that a throttling request threshold is exceeded;
   in response to determining that the throttling request threshold is exceeded, throttling translated versions of subsequently received requests sent to at least one of the plurality of routers.

18. The non-transitory, computer-readable storage medium of claim 17, wherein the throttling request threshold is a threshold specific to a particular router of the plurality of routers, and wherein said throttling translated versions of the subsequently received requests comprises throttling requests received for the particular router such that the threshold specific to the particular router is not exceeded.

19. The non-transitory, computer-readable storage medium of claim 16, wherein, in said selecting the request to be serviced, the program instructions cause the one or more computing devices to further implement:
   determining respective priority values for the request and each of the plurality of other pending requests for router information for the specified one or more routers according to the priority scheme;
   determining respective pending times for the request and each of the plurality of other pending requests for router information for the specified one or more routers;
   identifying one or more pending requests from among the request and each of the plurality of other pending requests with the highest respective priority value as candidate requests; and
   selecting from among the one or more candidate requests a candidate request with a longest respective pending time, wherein the selected candidate request is the request.

20. The non-transitory, computer-readable storage medium of claim 15, wherein the program instructions cause the one or more computing devices to further implement:

receiving another request from the client for other router information from the specified one or more routers, wherein the other request is formatted according to the programmatic interface; and in response to determining that the other request is improper, sending an error response to the client formatted according to the programmatic interface.

21. The non-transitory, computer-readable storage medium of claim 15, wherein the plurality of routers are implemented as edge routers for the provider network.

22. The non-transitory, computer-readable storage medium of claim 15, wherein the program instructions cause the one or more computing devices to further implement:

receiving another request from the client for other router information from the specified one or more routers, wherein the other request is formatted according to the programmatic interface;

determining that the other router information is already retrieved and is not valid; and in response to said determining, performing said maintaining, said selecting, said translating, said sending, and said providing for the other request.

\* \* \* \* \*